July 4, 1933. A. DE CLAIRMONT 1,917,212
CONDENSER
Filed Oct. 3, 1930
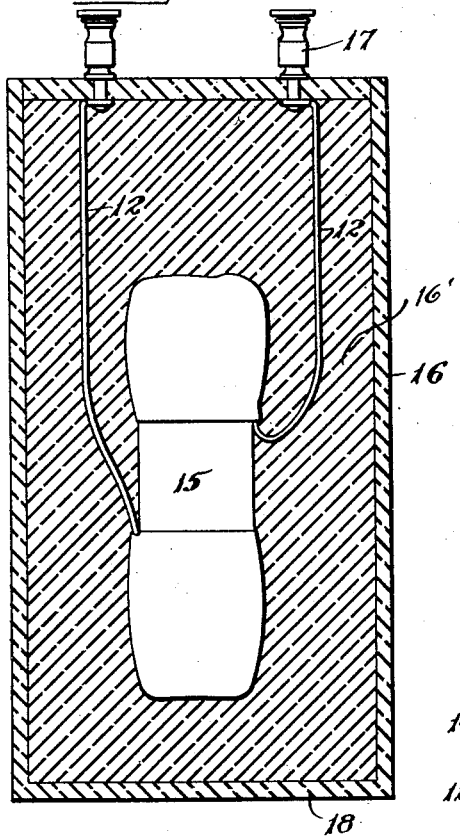
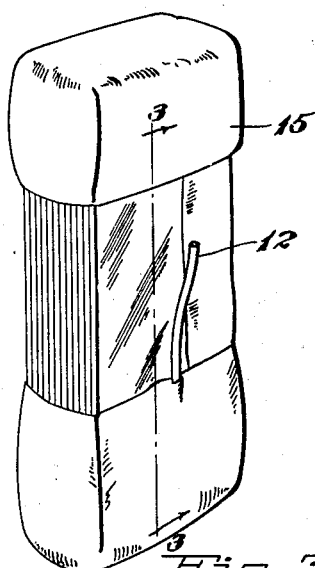
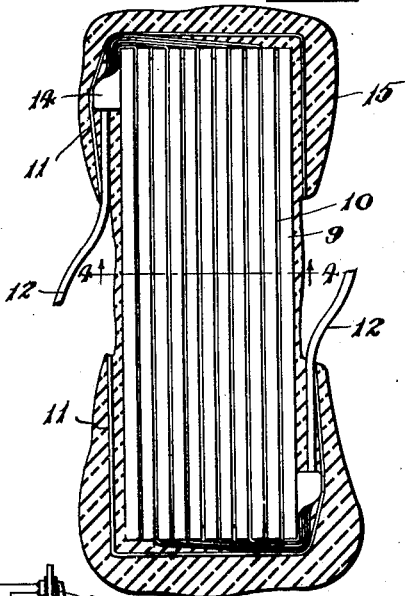
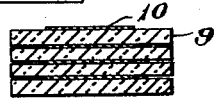
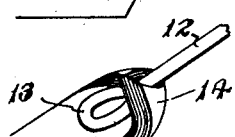
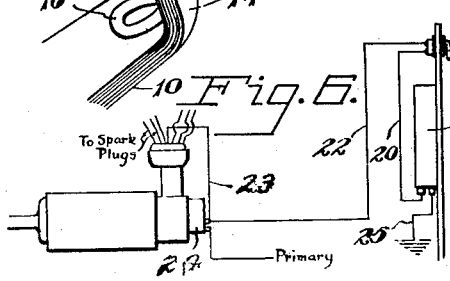
Inventor
A. de Clairmont
By Lacey & Lacey,
Attorneys Patented July 4, 1933

1,917,212

UNITED STATES PATENT OFFICE

ADOLPH DE CLAIRMONT, OF LOS ANGELES, CALIFORNIA

CONDENSER

Application filed October 3, 1930. Serial No. 486,249.

This invention relates to ignition devices for automobiles and the like and has for an object to provide a novel condenser, and process of making the same, for increasing the efficiency of spark plugs.

A further object of the invention is to provide a condenser formed of alternate sheets of glass and metal foil denuded of capillary air during manufacture so that puncturing or breaking down of the condenser when applied to the high tension circuit before it reaches the spark plugs, will be positively prevented.

A still further object of the invention is to provide a novel process for manufacturing the condenser, including the step of holding the alternate sheets of glass and metal foil squeezed together under great pressure during the dipping step to coat the assembled sheets, whereby trapping of air in the condenser during manufacture is positively prevented.

A still further object of the invention is to provide a novel process of manufacturing the condenser including a dipping step whereby the assembled sheets are insulated and bound firmly together by a composition containing sulphur under the second degree of heat.

With the above and other objects in view, the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view through a condenser constructed in accordance with my invention, Fig. 2 is a perspective view showing the assembled sheets of glass and metal foil prior to being embodied in the container, Fig. 3 is a longitudinal sectional view taken on the line 3—3 of Fig. 2, Fig. 4 is a cross sectional view taken on the line 4—4 of Fig. 3 with the insulating coating removed, Fig. 5 is a detail perspective view showing the method of securing the wire terminals to the metal foil sheets, and Fig. 6 is a diagrammatic view showing the condenser connected in the high tension circuit of an automobile.

Referring now to the drawing in which like characters of reference designate similar parts in the various views, the present embodiment of the invention is shown to comprise alternate glass and metal foil sheets 9 and 10 respectively.

For the purpose of a better understanding of the invention, a concrete example of a condenser includes a dozen sheets of thin glass, 1½ inches wide by 4½ inches long. Between these sheets of glass are placed very thin foil, made of pure copper and projecting beyond the end edges of the glass sheets. The actual surface of the copper foil is of such dimension as to leave one-half inch from the side or longitudinal edges of the glass separators, and leave one-eighth inch from the transverse end edges of the glass separators thereby allowing three inches of actual copper foil for use between the glass separators.

In carrying out the essential steps of the process employed to assemble the glass and metal foil sheets as an integral unitary structure devoid of capillary air, the pressure of heavy springs, weights, or other devices may be employed to force the metal foil sheets and glass separators into such intimate contact that the foil sheets are straightened out and all entrapped air squeezed from between the contacting faces of the foil and glass sheets. This pressure may be applied for instance by inserting the assembly between the jaws of a suitable pair of heavy pliers and closing the jaws firmly upon the assembled sheets. It is of importance that this pressure be maintained during at least a portion of the hereinafter described dipping step to positively prevent subsequent entrapping of air between the sheets.

As a safeguard, strong linen threads 11 or other material may be wound around the assembly of foil and glass sheets and tied while the sheets are held by the pliers to maintain the compressed condition of the assembled sheets during the dipping thereof.

It will be, of course, necessary to connect the ends of alternate metal foil sheets at each end of the assembled sheets to suitable conductor wires prior to or during the dipping and coating steps. By now referring to Fig. 5, it will be seen that the conductor wires 12 are each provided with a loop 13 at the end upon which the projecting ends 14 of the copper sheets 10 are overlapped to firmly anchor the conductor wires to the copper sheets. Solder may be employed if desired to bond the loops integrally with the overlapped ends of the copper sheets. By referring to Fig. 3, it will be seen that the conductor wires 12 project from the opposite ends of the assembled sheets and are bent back therealong and directed outwardly, for subsequent connection to the poles or binding posts of the container, as will be presently described.

The dipping compound employed consists preferably of a mixture of melted brimstone or sulphur, silica, and Portland cement, substantially in the following proportions. To one pound of common brimstone, melted, substantially 1.6 ounces of Portland cement is added, and 8 ounces of fine silica, preferably washed river sand, or lime in the form of marble crushings.

This compound is heated preparatory to the dipping of the bundle of compressed bound together sheets of glass and foil therein, to the second degree of heat. By "second degree of heat" is meant that stage of molten condition reached after the first thickening stage of the sulphur composition under heat treatment. More specifically, it is well known that common sulphur will melt at a certain degree Fahrenheit. As it gets hotter, the sulphur becomes very thick. Then as the heat increases, "second degree of heat," the sulphur again becomes as liquid as water. It is at this stage when the dipping of the bundle of metal foil and glass sheets takes place for hermetically sealing the condenser. In cooling, the sulphur composition first goes back to its thickened condition, then becomes fluid again, and then solidifies in its peculiar prismatic crystals.

The dipping operation is performed as follows. Into the liquid mass of sulphur composition above described, the bundle of assembled glass and metal foil sheets held together under great pressure to exclude re-entry of air therebetween, is dipped endwise, first at one end and then at the opposite end. Several immersions may be made in this manner to increase the thickness of the coating on the bundle. Before further coating, the conductor wires 12 are bent from the position shown in Fig. 5 to the position shown in Fig. 3. Then the dipping is continued until a continuous integral sheet of dielectric insulating coating, designated in general by the numeral 15, surrounds the assembled bundle of sheets.

It is to be understood that the pressure applied by the pliers or otherwise is continuous during at least a portion of this dipping stage. Each coat it will be understood, hardens almost instantly after each immersion of the bundle. Consequently, at the conclusion of the dipping operation, a non-porous crystalline coating will have been built upon the assembled foil and glass sheets having adequate firmness and rigidity to maintain the sheets firmly pressed together.

The extreme fluidity of the sulphur compound above described during "second heat" assures of the continuity of the coating over the entire outer surface of the bundle so that the finished product may be characterized as a unitary integral assembly of alternate sheets of metal foil and glass bonded together by a continuous integral envelope which confines the sheets in such intimate contact with each other as to preclude re-entry of the air squeezed from between the sheets by the pressure step of manufacture.

The resultant condenser has been found to be substantially impervious to puncture or breaking down under high tension currents so that the same may be effectively employed in the secondary system of motor ignition to intensify the spark of the spark plugs.

To complete the assembly of the condenser, the coated assembly of glass and metal foil sheets is inserted in a rubber box or container 16, as shown in Fig. 1. The conductor wires 12 are connected to suitable binding posts 17 in the top of the container. Thereupon, the container is turned upside down and the space between the condenser and container is solidly filled with the molten above described sulphur composition. The bottom 18 of the container is then applied. The sulphur compound cools and solidifies almost immediately.

In some instances, it will not be necessary to maintain the pressure of the pliers during the entire dipping stages of the glass and metal foil bundle since after sufficient thickness of the coating sulphur compound has accumulated on the bundle, the pliers may be discarded, after the above described linen threads 11 have been tied around the bundle. The threads may be severed if desired near the ends of the coating, as best shown in Fig. 3, after completion of the initial dipping stage of manufacture. Thereafter, the conductor wires 12 may be used as handles or grips to complete the dipping operation of the bundle of glass and metal foil strips until a coating of the desired thickness has accumulated thereupon.

The condenser above described may be used in the secondary ignition system to intensify the spark plugs of internal combustion motors or the like or is capable of use wherever high tension voltages are employed. The condenser so constructed will withstand puncture or breaking down under such high voltages as would quickly break down ordinary condensers embodying metal foil and separators of paper, cloth or other material coated with paraffine, shellac, or the like. Furthermore, my improved condenser, in addition to being leak-proof, is not affected by dampness of the atmosphere for the reason that it is manufactured under heat coincident with the expulsion of capillary air from between the metal foil sheets and glass separator sheets.

As an example of the installation of the condenser, by now referring to Fig. 6, it will be seen that the condenser, designated by the numeral 19, may be located at any convenient place on the automobile. One terminal of the condenser is connected by a wire 20 to one pole of a switch 21. The other pole of the switch is connected by a wire 22 preferably to the wire 23 that leaves the high tension coil 24 and runs to the center of the distributer. As an alternative, the wire 22 may be connected to the ignition high tension wire 23 where it enters the distributer. It may even be connected to any part of the high tension wire 23. The remaining pole of the condenser 19 is connected by a wire 25 to the ground at any convenient spot where good contact can be made with the iron or steel of the car.

In use, the condenser is connected in the circuit and serves to cooperate with the high tension coil 24 for producing a spark of great intensity. The condenser, obviously, permits a spark of much greater intensity being developed than would be developed by the coil alone. It is thus seen that a simple but highly efficient condenser is provided.

Having thus described the invention, I claim:

1. A condenser comprising alternate sheets of metal foil and glass, conductor wires operatively connected to the metal foil, and a coating of insulating material forming an integral unitary insulation upon the exterior of the sheets consisting of sulphur, silica and Portland cement.

2. A condenser comprising alternate sheets of copper foil and glass, conductor wires having loops on the ends thereof, the ends of alternate sheets of said copper foil projecting beyond the end edges of the glass sheets and being overlapped upon said loops, said overlapped ends being bent to position the conductor wires on opposite sides of said glass sheets, and an insulating coating of crystalline non-porous structure enveloping said sheets.

3. A condenser comprising alternate sheets of copper foil and glass, conductor wires having loops on the ends thereof, the ends of the alternate sheets of said copper foil projecting beyond the end edges of the last sheet and being overlapped to form said loops, said overlapped ends being bent to position the conductor wires on opposite sides of said glass sheets, and an insulating coating enveloping said sheets, said insulating coating being enlarged at each end portion of the condenser and serving to lock the loops in position upon the ends of the copper sheets.

4. A condenser comprising alternate sheets of metal foil and glass, and a coating surrounding said sheets, said coating comprising a compound of sulphur, silica and cement.

In testimony whereof I affix my signature.
ADOLPH DE CLAIRMONT. [L. S.]